United States Patent [19]

Skipper

[11] Patent Number: 5,195,728
[45] Date of Patent: Mar. 23, 1993

[54] ELASTOMERIC MOUNTING WITH FLUID DAMPING

[75] Inventor: John B. Skipper, Lutterworth, England

[73] Assignee: BTR plc, United Kingdom

[21] Appl. No.: 672,824

[22] Filed: Mar. 21, 1991

[30] Foreign Application Priority Data

Mar. 31, 1990 [GB] United Kingdom ............... 9007300

[51] Int. Cl.⁵ ..................... B60G 11/62; F16F 9/18
[52] U.S. Cl. ..................... 267/140.13; 267/140.12; 267/141.3
[58] Field of Search ............... 188/321.11; 248/550, 248/562, 636; 267/35, 140.1, 141, 141.2, 141.3, 219, 220

[56] References Cited

U.S. PATENT DOCUMENTS

| | | | |
|---|---|---|---|
| 2,432,050 | 12/1947 | Thiry | 248/358 |
| 2,562,195 | 7/1951 | Lee | 267/140.1 |
| 3,947,007 | 3/1976 | Pelat | 267/140.4 X |
| 4,572,321 | 2/1986 | Morita | 180/297 |
| 4,616,846 | 10/1986 | Furuya et al. | 267/140.1 X |
| 4,706,945 | 11/1987 | Watanabe et al. | 267/140.1 X |
| 4,739,979 | 4/1988 | Kanda | 267/140.1 |
| 4,741,521 | 5/1988 | Schiffner et al. | 267/140.1 |
| 4,830,346 | 5/1989 | Eberhard et al. | 188/219 X |
| 4,936,556 | 6/1990 | Makibayashi et al. | 267/140.1 |
| 5,005,810 | 4/1991 | Sawada et al. | 267/140.1 |

FOREIGN PATENT DOCUMENTS

| | | |
|---|---|---|
| 0129363 | 12/1984 | European Pat. Off. . |
| 0207194 | 1/1987 | European Pat. Off. . |
| 255434 | 2/1988 | European Pat. Off. ............ 248/562 |
| 0268785 | 6/1988 | European Pat. Off. . |
| 3823238 | 2/1989 | Fed. Rep. of Germany ...... 267/220 |
| 2255508 | 7/1975 | France . |
| 59-222636 | 12/1984 | Japan . |
| 209241 | 9/1987 | Japan ................................. 248/562 |
| 2008225 | 5/1979 | United Kingdom . |
| 2141518 | 12/1984 | United Kingdom . |

Primary Examiner—Robert J. Oberleitner
Assistant Examiner—Alfred Muratori
Attorney, Agent, or Firm—Stevens, Davis, Miller & Mosher

[57] ABSTRACT

A fluid-filled elastomeric mounting for a vehicle suspension comprises an inner rigid member, an outer rigid member which surrounds and is spaced from the inner rigid member, a pair of longitudinally spaced load-bearing annular elastomeric elements which interconnect the rigid members and define a fluid chamber, and in the fluid chamber a partition member secured to the inner rigid member to provide fluid damping in response to relative longitudinal movement of the rigid members, the partition member incorporating an elastomeric buffer arranged to be subject to radial compression when a predetermined level of relative movement of the rigid members is exceeded.

18 Claims, 2 Drawing Sheets

ELASTOMERIC MOUNTING WITH FLUID DAMPING

BACKGROUND OF THE INVENTION

This invention relates to an elastomeric mounting and in particular, though not exclusively, to an elastomeric mounting suitable for use in providing a low frequency suspension for a vehicle cab. It relates also to a suspension system comprising a plurality of said mountings.

A vehicle cab suspension, especially a road vehicle cab suspension, usually is required, for operator comfort, to exhibit low frequency and low stiffness characteristics over a wide range of dynamic deflections under normal cab loading conditions. Elastomeric material commonly is used in seeking to meet this requirement and it is known to provide a vehicle cab suspension comprising a pair of tubular metal members arranged co-axially one within the other and interconnected by an annular element of elastomeric material bonded to the tubular members. The annular elastomeric element is orientated such that the normal load of the cab acts in a direction parallel with the longitudinal axis of the tubular members and in consequence vertical movement of the cab relative to the vehicle body is accommodated by shear deflection of the elastomeric material. While the resulting suspension can provide a satisfactory performance it suffers the disadvantage of needing to be of large dimensions in order to allow for the magnitude of shear deflection necessary to accommodate the desired large range of dynamic deflection under normal cab loading conditions. It also suffers the disadvantage of often requiring the provision of additional damping means and of not having a sufficiently great conical stiffness.

SUMMARY OF THE INVENTION

The present invention seeks to provide for use in a vehicle cab suspension a mounting of more compact construction than hitherto known.

In accordance with the present invention an elastomeric mounting comprises a pair of rigid members arranged to define an annular space therebetween, a pair of annular elements of elastomeric material located in said annular space and each arranged to extend between and serve to interconnect said rigid members with said annular elements being axially spaced in the direction of relative longitudinal movement of the rigid members to define therebetween and between said rigid members a fluid chamber. Each said annular element of elastomeric material is of a shape which deforms by both shear and bending movements in the event of relative longitudinal movement of the rigid members but each element being substantially inextensible whereby a change of fluid pressure in the chamber does not result in the volume of the chamber changing significantly, and the elastomeric mounting additionally comprising integral damping means arranged to provide a damping effect additional to that provided by the annular elements of elastomeric material during relative longitudinal movement of the rigid members. The damping means is a fluid damping means comprising said fluid chamber filled with a substantially incompressible fluid and a partition member carried by the inner rigid members and movable therewith within the chamber during relative longitudinal movement of the rigid members thereby to provide a damping effect. The partition member comprising an annular elastomeric buffer bush at least a part of which is transversely compressible thereby to resist excessive relative movement between at least a part of the partition member and the outer rigid member in a transverse direction perpendicular to the direction of said relative longitudinal movement.

The elastomeric material of the annular elastomeric buffer bush preferably is subject to compression only when the rigid members exceed a predetermined magnitude of relative movement in said transverse direction. The partition member may be arranged to slide in fluid sealing engagement over a surface of the outer rigid member.

Each annular element of elastomeric material preferably is bonded to each of the rigid members (or an intermediate rigid member for association with one of said rigid members). Each element may be shaped and arranged such that when load is applied in said longitudinal direction the annular elastomeric element deforms from an initially unstressed condition by buckling and shear movement to exhibit a regressive stiffness charcteristic.

Each annular element of elastomeric material preferably extends between surfaces of the inner and outer rigid members the minimum spacing of which in said transverse direction is at least as great as the minimum thickness of the annular element in said direction of relative longitudinal movement.

Each annular element of elastomeric material preferably comprises between its inner and outer peripheries an annular section the thickness of which, as considered in the longitudinal direction, is less than the thickness of the element, in said direction, at at least one of the inner and outer peripheral regions. The two annular elements may be of corresponding constructions.

Preferably, as considered in a longitudinal cross-sectional plane, the minimum thickness of the annular element in said longitudinal direction is less than one half and more preferably less than or equal to one third of the thickness of the element as considered in a direction transverse of the longitudinal direction.

It is further preferred that the surfaces of the rigid members to which each annular element of elastomeric material is secured, e.g. bonding, be offset in the longitudinal direction when the mounting is in an unstressed condition.

In one preferred construction the partition member is provided with at least on orifice or a series of circumferentially spaced orifices for the restricted flow of fluid therethrough. Particularly in constructions in which the partition member is provided with an orifice for fluid flow therethrough. The partition member or a part thereof may be arranged normally to slide in fluid sealing engagement over the outer rigid member. In another embodiment an orifice may be defined by one or more spaces between a periphery of the partition member and a confronting surface of the outer rigid member relative to which the partition member moves during the aforementioned relative longitudinal movement. In a further embodiment portions of the fluid chamber on each side of the partition have port means associated therewith whereby during relative movement of the rigid members fluid may flow into and out of each chamber portion via a passage external of the chamber. The external passage may incorporate a fluid flow restrictor; that restrictor may be adjustable thereby to permit variation of the damping effect provided by the mounting for example after being installed in a suspension.

The invention provides also a suspension system such as a vehicle suspension system in which the elastomeric mounting is arranged such that the direction of relative longitudinal movement of the rigid members is substantially vertical during normal use of the suspension system. The mounting may be provided between a sprung and a relatively unsprung part of a vehicle whereby the weight of the sprung part is carried, at least in part, by shear loading of the pair of annular elements.

The invention further provides a suspension system comprising at least two mountings of a kind in which each mounting incorporates a fluid partition which divides the fluid chamber into upper and lower portions, the upper portion of the chamber of one mounting being arranged in fluid communication with a portion of the fluid chamber of the other mounting and the lower portion of the chamber of said one mounting being arranged in communication with a portion of the fluid chamber of said other or another mounting.

Preferably two mountings are intercoupled such that the upper fluid chamber portion of each mounting connects with the lower fluid chamber portion of the other. Alternatively if three or more mountings are provided portions of fluid chambers may be connected in a series arrangement without the two chamber portions of each of two chambers being directly interconnected.

A fluid passageway between the chamber portions of two mountings may incorporate a fluid flow restrictor; that restrictor may be adjustable to permit variation of the resistance to fluid flow therethrough.

BRIEF DESCRIPTION OF THE DRAWINGS

The above and other features of the invention will now be described, by way of example, with reference to the accompanying drawings in which.

DETAILED DESCRIPTION OF PREFERRED EMBODIMENTS

Figure 1:
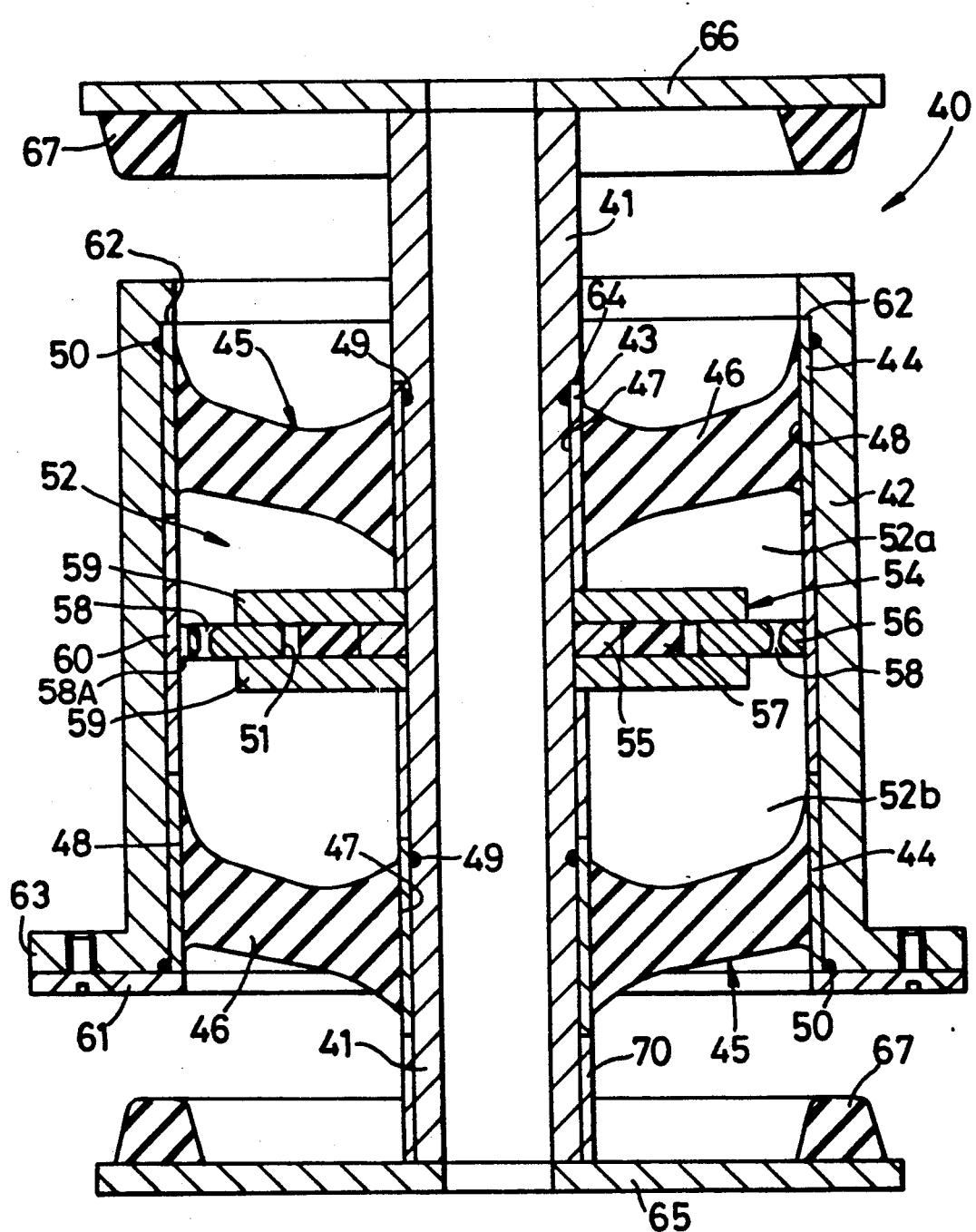
FIG. 1 is a longitudinal sectional view of an integral damped elastomeric mounting of the present invention when loaded in a static laden condition.

In the embodiment of the present invention shown in FIG. 1—an elastomeric mounting 40 for a vehicle cab suspension comprises an inner cylindrical metal tube or rigid member 41 and an outer metal tube or rigid member 42 which surrounds and is spaced from the inner tube over part of the length of the inner tube.

The tubes or rigid members 41,42 are interconnected by a pair of axially spaced annular load-bearing units 45 each comprising a rubber diaphragm 46 typically formed of non-reinforced natural rubber and bonded between inner and outer metal sleeves 43,44. A radically inner surface 47 of each diaphragm is bonded to an inner sleeve 43 and a radially outer region 48 is bonded to an outer sleeve 44.

The two outer sleeves 44 are maintained axially spaced within the outer rigid member 42 by means of an outer spacer sleeve 60. An upper of the outer bearing sleeves 44 abuts an inwardly extending shoulder 62 at one end of the outer rigid member 42 and a lower of the outer sleeves abuts an annular end plate 61 which is secured (by screws) to an outwardly extending flange 63 of the rigid member 42 subsequent to assembly of the two units 45 and the spacer sleeve 60 within the outer rigid member.

The two inner sleeves 43 are maintained axially spaced around the inner rigid member by a partition assembly 54 described in more detail below. An upper of the inner sleeves abuts a shoulder 64 on the inner rigid member and the assembly of the two inner sleeves and intervening partition assembly are held in position by a lower spacer sleeve 70 and a lower end plate 65 secured (by means not shown) to a lower end of the inner rigid member 41.

An upper plate 66 is secured to an upper end of the inner rigid member. Each end plate has bonded thereto an annular axial buffer bush 67 of a diameter corresponding to that of the outer rigid member. The bushes 67 normally lie spaced from the ends of the outer rigid member 42 but come into contact with it in the event of excessive longitudinal movement.

The thickness of each diaphragm in the longitudinal (vertical) direction of FIG. 1 at the point of minimum thickness of the diaphragm in said direction is substantially equal to one third of the radial thickness of the diaphragm as considered between the confronting surfaces of the tubes 41,42.

Each diaphragm 46 is of a shape which results in it experiencing both buckling and shear deformation when subject to an applied load which causes the inner tube to move downwardly relative to the outer tube from the relative orientation of FIG. 1. Associated with the buckling and shear deformation is a regressive load-deflection (i.e. stiffness) characteristic. That is, under increasing applied load from a condition of zero applied load the stiffness decreases, but later increases when an axial buffer bush 67 is engaged. The surfaces of the sleeves 43,44 to which a diaphragm is bonded lie offset in the vertical, longitudinal direction when in an unloaded condition and also when in a static laden condition as shown in FIG. 1.

A suitable radial compliance charcteristic under high radial load is provided by the annular load-bearing units 45 and also by a buffer bush 57 which is part of the aforementioned partition assembly 54.

The partition assembly 54 comprises an inner metal support ring 55 and an outer resilient annular bush element 57 of natural rubber bonded to the ring 55. Radially outwards of the resilient buffer bush 57 (and radially spaced therefrom when the mounting is radially unstressed) is an annular piston ring 56 which is slideable within the outer spacer sleeve 60 and is formed with a series of circumferentially spaced fluid orifices 58; this piston ring serves as a movable partition member for provision of fluid damping as the rigid members 41,42 move relative to one another. Further, orifices 58 could be provided by one or more spaces (58A) between the periphery of the piston ring 56 and the inner surface of sleeve 60.

The piston ring is located, at its radially inner portion, between a pair of partition support rings 59 which lie either side of the metal ring 55 and the resilient bush 57. The axial spacing of the support rings 59 is slightly greater than the thickness of the piston ring 56 in its longitudinal, axial direction whereby the bush 57 is engaged by a portion of the radially inner edge 51 of the piston ring when a predetermined relative radial movement is exceeded.

The inner and outer rigid members 41,42 and the axially spaced rubber diaphragms 46 define an annular chamber 52 which is wholly filled with oil or other incompressible fluid. Fluid leakage is resisted by O-ring seals 50 between the outer sleeves 44 and outer rigid members and seals 49 between the inner sleeves 43 and inner rigid member.

The fluid chamber 52 is divided by the piston ring 56 into upper and lower chambers 52a,52b between which incompressible fluid can flow, through the piston orifices 58, in the event of relative longitudinal movement of the inner and outer rigid members.

When the mounting is subject to dynamic conditions causing relative movement of the inner and outer members the incompressible fluid will be urged to flow through the orifices 58 and thereby provide a damping effect additional to the resiliency of the load bearing diaphragms 46.

High vertical deflection of the inner tube downwards relative to the outer tube is resisted by increasing stiffness of the annular load bearing diaphragms and subsequently the effect of the bump buffer 67. The relative movement of the inner and outer tubes is damped by the effect of fluid flow through the orifices 58, hysteretic damping of the diaphragms 46 and friction between the piston ring 59 and outer tube sleeve 60. Any rebound movement arising in spite of the damping effect is resisted by the increasing stiffness of the load bearing diaphragms 46 and the effect of a buffer ring 67.

Figure 2:
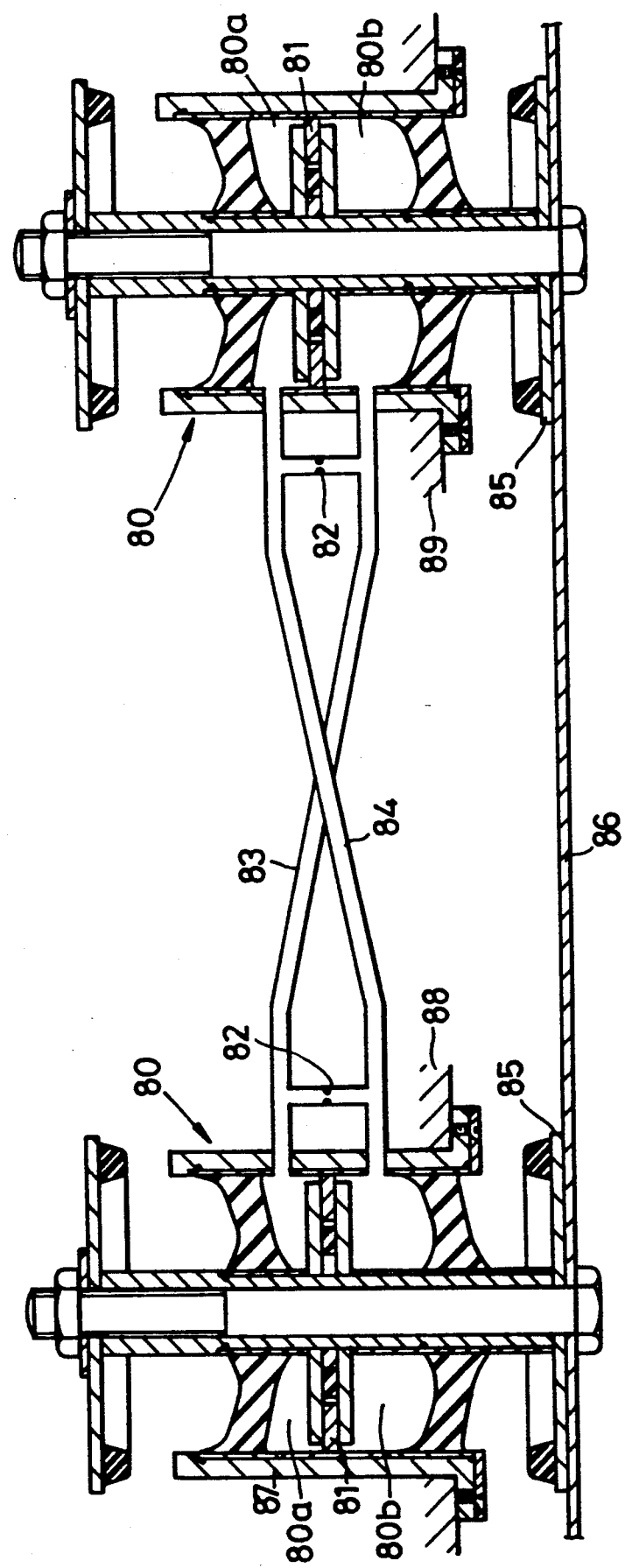
FIG. 2 is a longitudinal sectional view of parts of a suspension incorporating two elastomeric mountings of the invention.

In the embodiment shown in FIG. 2 a pair of mountings 80 are provided for use as part of a vehicle cab suspension.

Each mounting 80 is constructed substantially as described above in relation to the first embodiment of the invention except that instead of each piston ring 81 having fluid flow orifices, upper and lower fluid chambers 80a,80b communicate externally.

In this embodiment the chambers of a mounting 80 interconnect externally with one another externally via a restriction orifice 82.

The upper and lower chambers of each mounting also communicate respectively with lower and upper chambers of the other mounting via a pair of pipes 83,84.

The lower end plates 85 of the two mountings are secured to a common base plate 86 and the two outer rigid housings 87 carry supported structure(s) 88,89. The base plate may be part of a vehicle body or cab structure and the other rigid housings may support vehicle chassis structure or suspension arms associated respectively with two wheels of a vehicle.

In this arrangement, a downward movement of, say, the left-hand outer housing tends to reduce the volume of the upper chamber 80a of that housing. This results in fluid communication through pipe 83 to tend to increase the volume of fluid in the lower right-hand chamber 80b; in turn this tends to move the right-hand piston ring 81 upwards relative to the outer housing (actually to lower the outer housing) and there therefore also results a tendency for fluid to flow from the upper right-hand chamber through pipe 84 to the lower left-hand chamber thereby providing a stabilizing effect and limiting roll or tilting of the supported structure.

Additionally, in this arrangement the upper and lower chambers of each housing are interconnected by the by-pass restrictor 81 which allows low frequency fluid flow between the upper and lower chambers of a mounting.

What I claim is:

1. An elastomeric mounting comprising
    an inner rigid member and an outer rigid member arranged to define an annular space therebetween,
    a pair of annular elements of elastomeric material located in said annular space and each arranged to extend between and serve to interconnect said rigid members with said annular elements being axially spaced in a direction of relative longitudinal movement of the rigid members to define therebetween and between said rigid members a fluid chamber,
    each said annular element of elastomeric material being of a shape which deforms by both shear and bending movements during relative longitudinal movement of the rigid members but each element being substantially inextensible whereby a change of fluid pressure in the chamber does not result in the volume of the chamber changing significantly,
    the elastomeric mounting additionally comprising integral damping means arranged to provide a damping effect additional to that provided by the annular elements of elastomeric material during relative longitudinal movement of the rigid members,
    said damping means being a fluid damping means comprising said fluid chamber filled with a substantially incompressible fluid and a partition member carried by the inner rigid member and movable therewith within the chamber, said partition member having a periphery in sliding contact with an inner surface of said outer rigid member during relative longitudinal movement of the rigid members thereby to provide a damping effect,
    the partition member comprising an annular elastomeric buffer bush at least a part of which is transversely compressible thereby to resist excessive relative movement between at least a part of the partition member and the outer rigid member in a transverse direction perpendicular to the direction of said relative longitudinal movement.

2. An elastomeric mounting according to claim 1 wherein an elastomeric material of the annular elastomeric buffer bush is compressed only when the rigid members exceed a predetermined relative movement in the transverse direction.

3. An elastomeric mounting according to claim 1 wherein an orifice is define by a space between the periphery of the partition member and the inner surface of the outer rigid member relative to which the partition member slides.

4. An elastomeric mounting according to claim 1 wherein each annular element of elastomeric material extends between surfaces of the inner and outer rigid members which have a minimum spacing in said transverse direction which is at least as great as a minimum thickness of the annular element in said direction of relative longitudinal movement.

5. An elastomeric mounting according to claim 1 wherein the annular elements of elastomeric material have radially inner and radially outer cylindrically shaped surfaces which are bonded respectively to the inner and outer rigid members of said pair.

6. An elastomeric mounting according to claim 1 wherein each said annular element has a thickness in the longitudinal direction of the mounting which is less than one half the thickness of the element as considered in a direction transverse of the longitudinal direction.

7. An elastomeric mounting according to claim 1 wherein the partition member is provided with at least one orifice for restricted flow of fluid therethrough.

8. An elastomeric mounting according to claim 1 wherein portions of the fluid chamber on each side of the partition have port means associated therewith whereby fluid may flow into and out of each chamber portion during relative movement of the rigid members.

9. An elastomeric mounting according to claim 1 wherein each annular element of elastomeric material is shaped and arranged such that when load is applied in said longitudinal direction an annular elastomeric element deforms from an initially unstressed condition by buckling and shear movement to exhibit a regressive stiffness characteristic.

10. An elastomeric mounting according to claim 1 wherein each annular element of elastomeric material comprises between its inner and outer peripheries an annular section a minimum thickness of which, in the longitudinal direction, is less than a thickness of the element, in said longitudinal direction, at at least one of the inner and outer peripheral regions.

11. An elastomeric mounting according to claim 1 wherein surfaces of the rigid members to which each annular element of elastomeric material is secured are offset in the longitudinal direction when the mounting is in an unstressed condition.

12. An elastomeric mounting according to claim 1 when used in a vehicle suspension system and arranged with said direction of relative longitudinal movement substantially vertical at least during normal use of the suspension system.

13. An elastomeric mounting according to claim 1 when used in a vehicle suspension system and arranged with one of the rigid members secured to a sprung part of the vehicle and the other rigid member secured to a relatively unsprung part of the vehicle, and said direction of relative longitudinal movement being substantially vertical whereby gravitational forces acting on the sprung part of the vehicle results in shear loading of the pair of annular elements.

14. At least two vertically arranged elastomeric mountings according to claim 1 when used in a vehicle suspension system wherein the fluid partition of each mounting divides the fluid chamber into upper and lower portions, the upper portion of the chamber of a first of said mountings being arranged in fluid communication with a portion of the fluid chamber of another of said mountings and the lower portion of the chamber of said first mounting being arranged in communication with a portion of the fluid chamber of another of said mountings.

15. A mounting according to claim 14 wherein a fluid passageway is provided between the chamber portions of two mountings and incorporates a fluid flow restrictor.

16. A mounting according to claim 15 wherein said restrictor is adjustable to permit variation of resistance to fluid flow therethrough.

17. A mounting according to claim 14 and comprising two said mountings intercoupled with the upper fluid chamber portion of each mounting connecting with the lower fluid chamber portion of the other.

18. An elastomeric mounting comprising
an inner rigid member and an outer rigid member arranged to define an annular space therebetween,
a pair of annular elements of elastomeric material located in said annular spaced and each arranged to extend between and serve to interconnect said rigid memebers with said annular elements each having radially inner and radially outer cylindrically shaped surfaces which are bonded respectively to the inner and outer rigid members and the annular elements being axially spaced in a direction of relative longitudinal movement of the rigid members to define between said annular elements and said rigid members a fluid chamber,
each said annular element of elastomeric material being of a shape which deforms by both shear and bending movements during relative longitudinal movement of the rigid members but each element being substantially inextensible whereby a change of fluid pressure in the chamber does not result in the volume of the chamber changing significantly,
each said annular element having a thickness in the longitudinal direction of the mounting which is less than one half the thickness of the element as considered in a direction transverse to the longitudinal direction,
incompressible fluid in said fluid chamber and fluid damping means within the fluid chamber to provide a damping effect additional to that provided by the annular elements of elastomeric material during relative longitudinal movement of the rigid members,
said fluid damping means comprising a partition member which is carried by the inner rigid member for movement therewith within the chamber, said partition member having a periphery in sliding contact with the inner surface of the outer rigid member, said partition member being in the form of an annular elastomeric buffer bush at least a part of which is radially compressible when the rigid members exceed a predetermined relative movement in the transverse direction and thereby serves also to resist excessive relative radial movement between at least a part of the partition member and one of the rigid members in a transverse, radial direction perpendicular to the direction of the relative longitudinal movement.

* * * * *